Figure 1:
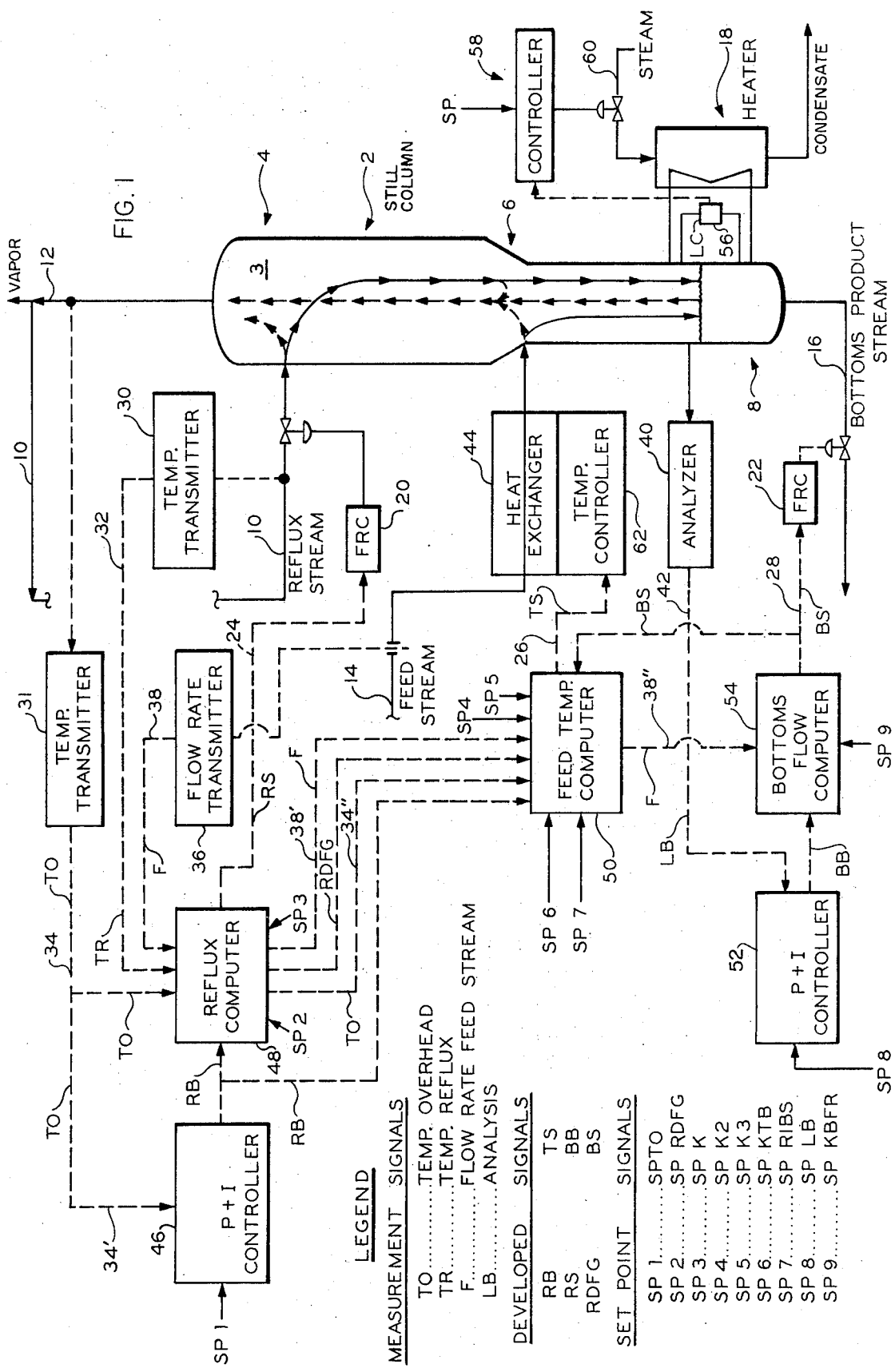

United States Patent [19]
Hobbs et al.

[11] 3,793,157
[45] Feb. 19, 1974

[54] METHOD FOR SEPARATING A MULTICOMPONENT FEEDSTREAM
[75] Inventors: James W. Hobbs, Bartlesville, Okla.; Ricardo J. Callejas, Old Ocean, Tex.
[73] Assignee: Phillips Petroleum Company, Washington, D.C.
[22] Filed: Mar. 24, 1971
[21] Appl. No.: 127,542

[52] U.S. Cl. .................................... 203/2, 196/132
[51] Int. Cl. ........................... B01d 3/42, C10g 7/00
[58] Field of Search ............ 203/2; 196/132; 159/44

[56] References Cited
UNITED STATES PATENTS

| | | | |
|---|---|---|---|
| 3,139,391 | 6/1964 | Walker | 196/132 X |
| 3,269,921 | 8/1966 | Oglesby | 203/2 |
| 3,272,722 | 9/1966 | Walker | 203/2 |
| 3,361,646 | 1/1968 | MacMullen et al. | 203/2 X |
| 3,392,088 | 7/1968 | Johnson | 196/132 X |
| 3,408,261 | 10/1928 | Johnson et al. | 203/2 X |
| 3,428,528 | 2/1969 | Oglesby, Jr. et al. | 203/2 X |
| 3,441,485 | 4/1969 | Jones | 203/2 X |
| 3,449,215 | 6/1969 | Johnson et al. | 196/132 X |

*Primary Examiner*—Jack Sofer
*Attorney, Agent, or Firm*—Young and Quigg

[57] ABSTRACT

A method for separating a multicomponent hydrocarbon feedstream in a column into an overhead vapor stream and a liquid bottoms-product stream having a specified purity by maintaining the overhead vapor stream at about one preselected temperature, maintaining the rate of heat input into the column by the feedstream at a value greater than the heat input into said column by a lower portion heating means, and regulating the rate of heat input into the column by the feedstream for maintaining the liquid bottoms-product stream at the preselected purity.

20 Claims, 2 Drawing Figures

METHOD FOR SEPARATING A MULTICOMPONENT FEEDSTREAM

There is ever-increasing activity in the art of fractional distillation to optimize the operation of a distillation column so that products with desired specifications can be produced for minimum operating costs at the column's optimum design value. Optimizing the operation of a distillation column is complicated, difficult, and tricky because of the column's numerous degrees of freedom, which are characterized as independent input variables, some of which are controllable (e.g., feedstream temperature and lower heating means heat flow) and others of which are uncontrollable (e.g., ambient temperature and feed composition). Many methods and means have been proposed, patented or used in an effort to reduce the column's degrees of freedom. However, there still remains a need for a suitable automatic method and means for optimizing the control of a distillation column to produce selected product specifications with minimum utilities consumption and maximum utilization of the unit.

This invention therefore resides in a method for separating a multicomponent hydrocarbon feedstream into an overhead vapor stream and a liquid bottoms-product stream having a specified purity by maintaining the overhead vapor stream at about one preselected temperature, maintaining the rate of heat input into the column by the feedstream at a value greater than the input into said column by a lower portion heating means, and regulating the rate of heat input into the column by the feedstream.

It is therefore an object of this invention to control the operation of a distillation column in an improved and unique manner. Another object of this invention is to provide a means for predicting what the feed temperature should be in order for the column to produce a product of desired specification. Yet another object is to provide a method and means for controlling the operation of a distillation column by an improved control system which automatically manipulates the rate of heat input into the column by the feedstream to maintain the operation of the column at optimum levels and produce a product having a specified purity.

Figure 2:
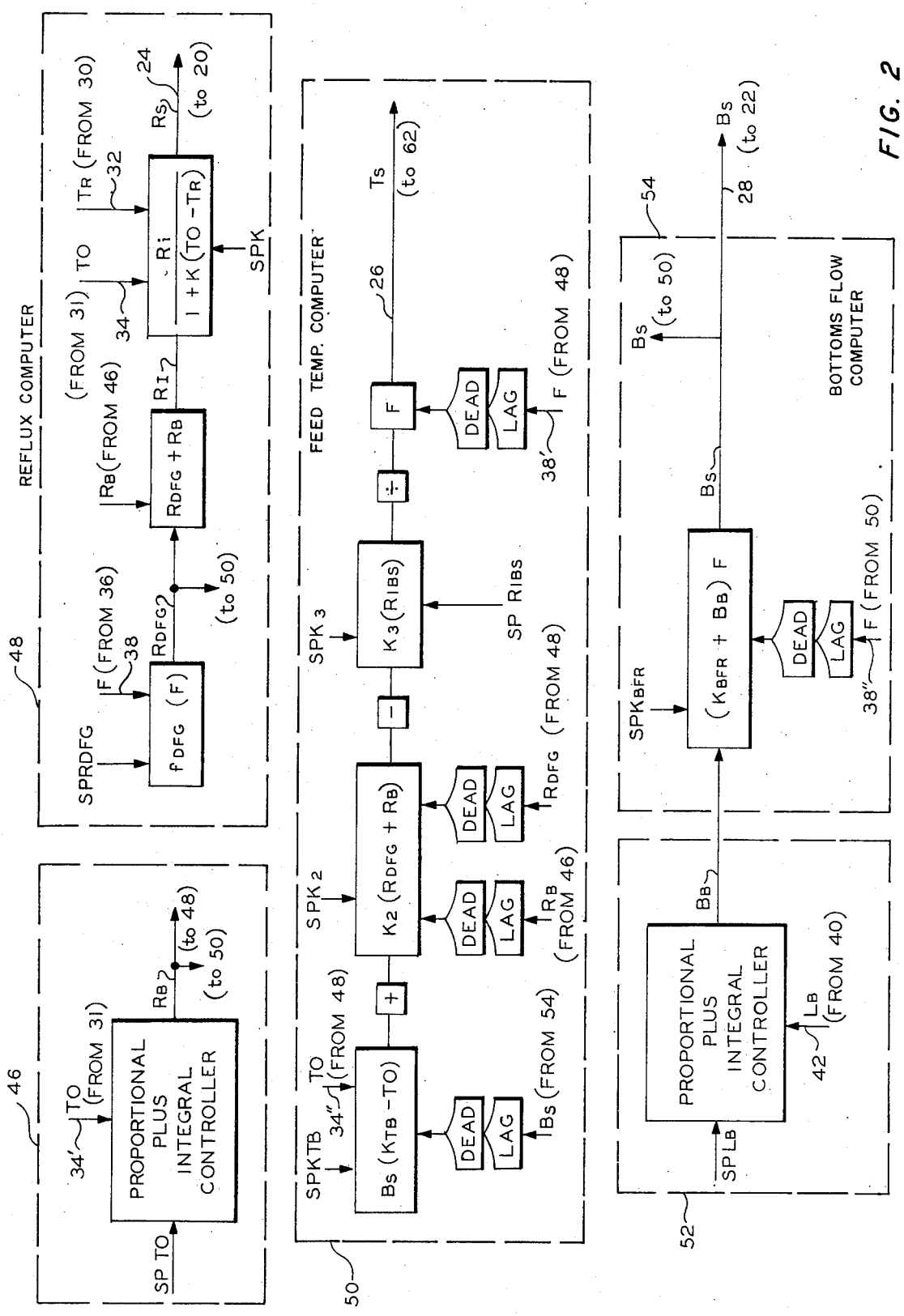

Other aspects, objects, and advantages of the present invention will become apparent from a study of the disclosure, the appended claims, and the accompanying drawing in which FIG. 1 shows the column, controls, and computers of this invention, and FIG. 2 symbolically shows the mathematical calculations of the computers.

Referring to FIG. 1, a distillation column 2, for example a deethanizer column, has a chamber 3 and upper, middle, and lower portions 4,6,8. As known in the art, a reflux stream 10 enters the upper portion 4, an overhead vapor stream 12 discharges from the upper portion 4, a multicomponent feedstream 14 enters the middle portion 6, a liquid bottoms-product stream 16 discharges from the lower portion 8, and a lower portion heating means 18, such as a conventional reboiler is provided for the input of heat into the column 2.

Flow controllers 20 and 22 as known in the art, such as Foxboro Model M/40 Controller described in Bulletin 5A-10A, November 1955, Foxboro Company, Rt. FO, Foxboro, Mass., for example, are positioned within the reflux stream 10 and the liquid bottoms-product stream 16 for controlling the flow rates of said streams in response to signals delivered thereto through respective lines 24 and 28. The delivered signals of this invention can be electrical, pneumatic, or hydraulic cylinders, but for convenience and ease of installation, it is preferred that the delivered signals are electrical signals.

Temperature sensing-signaling means 30,31, as known in the art, such as the Foxboro Dynatherm Resistance Bulb described in Bulletin 427-1, August 1950, Foxboro Company, Foxboro, Mass., for example, are associated with the reflux stream 10 and overhead vapor stream 12 for measuring the temperature of their respective streams and delivering signals through respective leads 32,34 representative of those measured temperatures.

A flow rate sensing-signaling means 36, as known in the art, such as the Foxboro Differential Type Flow Meter described in Bulletin 351, Foxboro Company, Foxboro, Mass., for example, is associated with the feedstream 14 for measuring the flow rate of said stream and delivering a signal through line 38 representative of said flow rate. An analyzing-signaling means 40, as known in the art, such as the Model 214 Chromatograph described in Bulletin DWO 9679 by Applied Automation, Inc., 3838 S.E. State St., Bartlesville, Oklahoma 74003, for example, is associated with the lower portion 8 of the column 2 for analyzing a liquid contained therein and delivering a signal through lead 42 representative of the amount of a preselected component of said liquid.

A feed heat exchanger 44 is associated with the feedstream 14 for controlling the temperature of the feedstream in response to a signal delivered through lead 26.

A proportional plus integral controller 46, as known in the art, and a reflux computer 48 are associated with the flow controller 20 of the reflux stream 14, a feed temperature computer 50 is associated with the feed heat exchanger 44 of the feedstream 14 and a proportional plus integral controller 52, as known in the art, and a bottoms flow computer 54 are associated with the flow controller 22 of the liquid bottoms-product stream 16.

The object of the distillation column, of course, is to separate the multicomponent feedstream into at least two fractions, an overhead and a bottom product. The light components of the feed will appear mainly in the overhead and the heavy components of the feed will appear mainly in the bottom product. The light components will comprise a light key component and components lighter than the light key component, while the heavy components will comprise a heavy key component and components heavier than the heavy key component. Since perfect separation between the two key components is impossible, some of the heavy key components will appear as an impurity in the overhead (and thus in the distillate product) and some of the light key components will appear as an impurity in the bottom product. However, the amount of these impurities can be kept down to desired levels by proper operation of the column. The operation of the distillation column can be specified by specifying the fraction of the heavy key component desired in the overhead (or distillate product) and the fraction of the light key component desired in the bottom product. If these specifications are to be met at minimum operating costs and at minimum utilization of the column, corrective actions must be taken at the proper time and rate to minimize the effects of disturbances on product compositions and flows.

The operation of such a distillation column is affected by disturbances in independent input variables (i.e., variables which can change or be changed independently without any effect of one upon the other). Such independent variables can either be manipulated or are uncontrolled. Feed composition and ambient temperature are examples of independent input variables which cannot be altered or controlled (within the limits of the process in question). Feed temperature, reflux temperature, and lower heating means flows are examples of manipulated or controlled independent input variables. Then there are dependent output variables, such as the purities of the distillate and bottom products, which are a function or result of the independent variables. As should be evident, a distillation column has numerous degrees of freedom and any significant step in the control of the operation of a distillation column must reduce these degrees of freedom.

An input variable of primary concern in this invention is the reflux flow rate. Uncontrolled fluctuations in this variable can affect purity and operation costs. But in speaking about reflux flow rate, it is necessary to distinguish between external reflux flow rate and internal reflux flow rate. The external reflux flow rate is the flow rate of liquid returned to the top of the column, i.e., the flow rate of the reflux stream controlled by flow controller 20. The internal reflux flow rate is the flow rate of liquid leaving the top tray and is in the sum of the external reflux flow rate plus the flow rate of that liquid which results from the condensation of vapors in the top of the column upon contact with the cool, external reflux. Holding the flow rate of the external reflux constant is no guarantee that the internal reflux remains constant. Thus, for efficient operation it is the internal reflux flow rate which must be maintained at the optimum value. Unfortunately, it is difficult to measure the actual flow of internal reflux because there is no economical way to install an orifice plate or primary flow measuring device in the column.

In the method of this invention, the liquid bottom product is controlled at a specified purity by maintaining the temperature of the overhead vapor stream 12 at about one preselected temperature and regulating the rate of heat input into the column 2 by the feedstream while maintaining the rate of heat input into the column 2 by the feedstream at a value greater than the heat input into the column by the lower portion heating means 18. By so controlling the location and rate of heat input into the distillation column 2, it has been discovered that a specified purity of the product stream 16 can be more easily maintained.

The ratio of heat input into the column 2 by the feedstream to the heat input into the column 2 by the lower portion heating means 18 is preferably maintained at a value greater than about 18. It is also preferred that the rate of heat input into the column 2 by the lower portion heating means 18 be controlled relative to the height of liquid within the column 2. A liquid level sensor 56, for example, as shown in FIG. 1, is associated with the chamber 3 of the lower portion 8 of the column 2 and controlling means 58 of the steam line 60 of the lower heating means 18. It has also been found, where the column 2 is a deethanizer column, that maintaining the overhead vapor stream 12 at a preselected temperature in the range of about −50° to −55° F and the mol percent of ethane in the liquid bottoms-product stream 16 in the range of about 0.2 to 1.0 mol percent decreases the difficulty in controlling the operation of the column at optimum efficiency.

Referring also to FIG. 2, a process variable is measured that is indicative of the flow rate of the feedstream 14 by the flow sensing-signaling means 36 and a signal (F) representative of the feedstream flow rate is delivered through lines 38, 38' and 38'' to the reflux computer 48, the feed temperature computer 50 and bottoms flow computer 54. The temperature of the overhead vapor stream 12 is measured by the temperature sensing-signaling means 31 and a signal ($T_0$) representative of the overhead vapor stream temperature is delivered through lines 34, 34', and 34'' to the reflux computer 48, the proportional plus integral controller 46, and the feed temperature computer 50. The temperature of the external reflux stream 10 is measured by the temperature sensing-signaling means 30 and a signal ($T_R$) representative of the reflux stream temperature is delivered through line 32 to the reflux computer 48.

A predicted internal reflux flow rate is determined as known in the art from an experimentally derived equation based on the expression:

$$R_{DFG} = f_{DFG}(F)$$

where:
  $R_{DFG}$ = predicted internal reflux flow rate for said column (volume per unit time);
  $F$ = flow rate of said feedstream (volume per unit time); and
  $f_{DFG}$ = a function of the flow rate.

An overhead vapor stream set point, for example −50° to −55° F and the signal $T_0$ representative of the overhead vapor temperature is passed to the proportional plus integral controller 46 for obtaining therefrom a signal $R_B$ representative of the difference between the overhead vapor temperature set point and the measured vapor temperature signal $T_0$. That signal $R_B$ is delivered to the reflux computer 48 and the feed temperature computer 50.

The reflux computer 48 receives the representative signals $T_0$ and $T_R$ and combines said signals with the predicted internal reflux flow rate $R_{DFG}$, the signal $R_B$ from a controller 46, and a constant K in the equation based on the expression:

$$R_S = (R_{DFG} + R_B)/1 + K(T_0 - T_R)$$

where:
  $K = C_P/\eta$;
  $C_P$ = specific heat of said external reflux stream; and $\eta$ = heat of vaporization of said external reflux stream for obtaining a signal $R_S$ representative of said expression.

A signal representative of the value $R_S$ is then delivered through line 24 from the reflux computer 48 to the flow controller 20 for controlling the flow rate of the external reflux stream 10 entering the column 2.

One of the components, for example $C_2$ of the liquid bottoms-product stream 16 is analyzed by the analyzer 40 and a signal $L_B$ representative of the amount of that constituent in the stream is delivered to the proportional plus integral controller 52 through line 42. At the controller 52, the signal $L_B$ is compared to a constant set point, and a signal $B_B$ representative of the difference between $L_B$ and the set point is delivered to the bottoms flow computer 54. The signal $B_B$ and the signal F representative of the flow rate of the feedstream are combined together with a signal $K_{BFR}$ proportional to a constant in an expression based on an equation $$B_S = (K_{BFR} + B_B)F$$

where:
 $K_{BFR}$ = predicted liquid bottoms product stream flow rate divided by predicted feed flow rate for obtaining a resultant signal $B_S$ that is representative of that expression.

The signal $B_S$ is delivered to the flow controller 22 for controlling the flow rate of the liquid bottoms-product stream 16 discharging from the lower portion 8 of the column 2 and to the feed temperature computer 50.

The feed temperature computer 50 receives the signals $T_O$, F, and $B_S$, together with a signal proportional to a set point $R_{IBS}$ that is representative of an internal reflux in the lower portion 8 of the column 2 in an expression based on the equation $$T_S = T_O + [B_S(K_{TB}-T_O) + K_2(R_{DFG} + R_B) - K_3(R_{IBS})]/F$$

where:
 $K_{TB}$ = predicted temperature of the liquid bottoms product stream; and
 $K_2 = \eta/C_{PD}$ where $\eta$ equals heat of vaporization of the external reflux stream and $C_{PD}$ equals specific heat of the overhead vapor stream.
 $K_3 = \eta_B/C_{PD}$ where $\eta_B$ equals heat of vaporization of the bottom product stream and $C_{PD}$ equals specific heat of the overhead vapor stream. The signal $T_S$ is delivered to the temperature controller 62 of the feed heat exchanger 44 for controlling the temperature of the feedstream 14.

Where the column 2 is a deethanizer column, the value of K in the expression $R_S$ is preferably in the range of about 0.002 to 0.007, the value of $K_{BFR}$ in the expression $B_S$ is preferably in the range of about 0.02 to 0.1 and the value of $K_{TB}$ in the expression $T_S$ is a value preferably in the range of about 85–150. The analyzer 40 utilized in this invention can also be utilized to analyze hydrocarbons in the range of $C_1$–$C_3$.

As known in the art, lag and dead time constituents can be applied to one or more of the signals to adjust the signal to avoid sudden, abrupt controlling by their associated elements.

For example, lag and dead time constants are preferably applied to the signals $B_S$, $R_B$, $R_{DFG}$, and F for obtaining the signal T and the signal F for obtaining the signal $B_S$.

Variables and controlling signal examples of this invention are as follows:

F = 160,000 lb/hr
$_{DFG}$(F) = 56700 lb/hr
$R_{DFG}$ = 56700 Lb/hr
$R_B$ = 0.0 lb/hr
K = 0.003 (°F)$^{-1}$ $C_P$ = 0.468 btu/(°F lb)

n = 156 btu/lb $T_O$ = −49°F
$T_R$ = −26°F
$B_S$ = 5620 lb/hr $K_{BFR}$ = 0.0340 lb/hr/lb/hr
$B_B$ = 0.00113 lb/hr/lb/hr
$K_{TB}$ = 127°F
$K_2$ = 312°F $C_{PD}$ = 0.5 btu/(°F lb)

$K_3$ = 280°F $n_B$ = 140 btu/lb $R_{IBS}$ = 32430 lb/hr

By automatic control of the temperature of the overhead vapor stream, automatic control of the purity of the bottom product stream, and automatic control of flow of the lower-portion internal reflux stream, control of column 2 is achieved by simultaneously manipulating flow of the external reflux stream, flow of the bottom product stream, and temperature of the feedstream. Disturbances in feedstream flow and reflux temperature are compensated with feed-forward action before the disturbances can significantly upset the operation of column 2.

Other modifications and alterations of this invention will become apparent to those skilled in the art from the foregoing discussion, example, and accompanying drawing, and it should be understood that this invention is not to be unduly limited thereto.

What is claimed is:

1. In controlling apparatus of a distillation column having a chamber, upper, middle, and lower portions, a reflux stream entering the upper portion, an overhead vapor stream discharging from the upper portion, a multicomponent feedstream entering the middle portion, a liquid bottoms product stream discharging from the lower portion, and a lower portion heating means, the improvement comprising: first means for controlling the flow rate of the reflux stream into the column in response to the temperature of the overhead stream, temperature of the reflux stream, and flow rate of the feedstream, said first means comprising:
 a. second means for measuring the temperature of the reflux stream and delivering a signal $T_R$ representative of that temperature;
 b. third means for measuring the temperature of the overhead stream and delivering a signal $T_O$ representative of that temperature;
 c. fourth means for measuring the flow rate of the feedstream and delivering a signal F representative of that temperature;
 d. fifth means for receiving the signal $T_O$, comparing said signal to a set point (SP $T_O$), and delivering a signal $R_B$ representative of the difference between the received signal and said set point;
 e. sixth means for receiving signals $R_B$, $T_R$, $T_O$, and F and delivering a signal $R_{DFG}$ representative of the quantity (SP $R_{DFG}$)(F) and a signal $R_S$ representative of the quantity $$(SP\ R_{DFG})(F) + R_B/1 + K(T_O-T_R)$$

where signals (SP $R_{DFG}$) and (K) are preselected set point signals of the sixth means; and
 f. seventh means for controlling the flow of the reflux stream into the column in response to signal $R_S$; eighth means for controlling the flow rate of the bottoms product stream in response to an analysis of a liquid from the bottom portion of the column and the flow rate of the feedstream; and ninth means for controlling the temperature of the feedstream in response to the temperature of the overhead stream, flow rate of the feedstream, and the flow rate of the bottoms product stream with the heat input into the column by the feedstream being maintained at a value greater than the heat input into said column by said lower portion heating means.

2. Apparatus as set forth in claim 1, wherein the eighth means comprises:
eleventh means for delivering a signal $L_B$ representative of the amount of a preselected component in a volume of liquid from the lower portion of the column;
twelfth means for receiving signal $L_B$, comparing said signal to a preselected set point (SP $L_B$) and delivering a signal $B_B$ representative of the difference between the received signal and said set point;
thirteenth means for receiving signals $B_B$ and F and delivering a signal $B_S$ representative of the quantity $(K_{BFR} + B_B)(F)$ where $K_{BFR}$ is a signal of the thirteenth means, said signal F being a signal representative of the flow rate of the feedstream; and
fourteenth means for controlling the flow of the liquid bottoms product stream from the column in response to signal $B_S$.

3. Apparatus, as set forth in claim 1, wherein the ninth means comprises:
tenth means for receiving signals $T_O$, F, $R_B$, $R_{DFG}$, and $B_S$ and delivering a signal $T_S$ representative of the quantity $$[B_S(K_{TB}-T_O)] + [K_2(R_{DFG} + R_B)] - [K_3(R_{IBS})]$$

where $K_{TB}$, $R_{IBS}$, $K_2$, and $K_3$ are setpoint signals of the fourteenth means and $B_S$ is a signal representative of the flow rate of the bottoms product stream.

4. An apparatus, as set forth in claim 3, including means for applying dead time and lag time constants to the signals $B_S$, $R_B$, $R_{DFG}$, and F delivered to the 14th means.

5. Apparatus, as set forth in claim 3, wherein the eighth means comprises:
eleventh means for delivering a signal $L_B$ representative of the amount of a preselected component in a volume of liquid from the lower portion of the column;
twelfth means for receiving signal $L_B$, comparing said signal to a preselected set point (SP $L_B$) and delivering a signal $B_B$ representative of the difference between the received signal and said set point;
thirteenth means for receiving signals $B_B$ and F and delivering a signal $B_S$ representative of the quantity $(K_{BFR} + B_B)(F)$ where $K_{BFR}$ is a signal of the thirteenth means; and
fourteenth means for controlling the flow of the liquid bottoms product stream from the column in response to signal $B_S$.

6. An apparatus, as set forth in claim 5, wherein the 10th means delivers a signal representative of the amount of a preselected hydrocarbon having carbon molecules in the range of $C_1$ to $C_3$.

7. An apparatus, as set forth in claim 5, including means for applying dead time and lag time constants to the signal F delivered to the 12th means.

8. In a distillation process for separating a multicomponent feedstream within a column having upper, middle, and lower portions with a reflux stream entering the upper portion, an overhead vapor stream discharging from the upper portion, a feedstream entering the middle portion, and a liquid bottoms product stream discharging from the lower portion of the column with said bottoms product stream having a preselected purity, and a lower portion heating means for heating the column, the improvement comprising:
continuously maintaining the rate of heat input into the column by the feedstream at a value greater than the heat input into said column by the lower portion heating means, the ratio of the rate of heat input by the feedstream to the rate of heat input by the lower portion heating means being a value greater than about 18;
controlling the flow rate of the reflux stream into the column in response to the temperature of the overhead stream, temperature of the reflux stream, and flow rate of the feedstream;
controlling the flow rate of the bottoms product stream in response to an analysis of a liquid from the bottom portion of the column and the flow rate of the feedstream; and
controlling the temperature of the feedstream in response to the temperature of the overhead stream, flow rate of the feedstream, and the flow rate of the bottoms product stream.

9. A process, as set forth in claim 8, wherein the feedstream comprises ethane and including maintaining the temperature of the overhead vapor stream at a temperature in the range of about $-50°$ to $-55°$ F.

10. A process, as set forth in claim 8, wherein the feedstream comprises ethane and including maintaining the mol percent of ethane in the liquid bottoms product stream in the range of about 0.2–1.0 mol percent.

11. A process, as set forth in claim 8, including analyzing a hydrocarbon having carbon molecules in the range of $C_1$ to $C_3$.

12. A process, as set forth in claim 8 wherein controlling the flow rate of the reflux stream comprises:
measuring the temperature of the reflux stream and delivering a signal $T_R$ representative of that temperature;
measuring the temperature of the overhead stream and delivering a signal $T_O$ representative of that temperature;
measuring the flow rate of the feedstream and delivering a signal F representative of that temperature;
receiving the signal $T_O$, comparing said signal to a setpoint (SP $T_O$) and delivering a signal $R_B$ representative of the difference between said received signal and said setpoint;
receiving signals $R_B$, $T_R$, $T_O$, and F and delivering a signal $R_{DFG}$ representative of the quantity (SP $R_{DFG}$)(F) and a signal $R_S$ representative of the quantity $$(SP\ R_{DFG})(F) + R_B/1 + K(T_O-T_R)$$

where signals (SP $R_{DFG}$) and (K) are preselected setpoint signals;
$K = C_P/\eta$
$C_P$ = specific heat of said external reflux stream
$\eta$ = heat of vaporization of said external reflux stream
$R_{DFG} = (SP\ R_{DFG})(F)$
SP $R_{DFG}$ = preselected internal reflux setpoint; and controlling the flow of the reflux stream into the column in response to signal $R_S$.

13. A process as set forth in claim 12 wherein K is a value in the range of about 0.002–0.007 per °F.

14. A process, as set forth in claim 12, wherein controlling the temperature of the feedstream comprises:

receiving signals $T_O$, F, $R_B$, $R_{DFG}$, and $B_S$ and delivering a signal $T_S$ to the feedstream, said signal being representative of the quantity $$[B_S(K_{TB}-T_O)] + [K_2(R_{DFG} + R_B)] - [K_3(R_{IBS})]$$

where $K_{TB}$, $R_{IBS}$, $K_2$, and $K_3$ are set point signals;

$K_{TB}$ = preselected temperature of the liquid bottoms product streams;

$K_2 = \eta/C_{PD}$ where $\eta$ = heat of vaporization of the external reflux stream and $C_{PD}$ = specific heat of the overhead vapor stream;

$K_3 = \eta_B/C_{PD}$ where $\eta_B$ = heat of vaporization of the bottoms product stream and $C_{PD}$ = specific heat of the overhead vapor stream;

$R_{IBS}$ = internal reflux in the lower portion of the column;

$B_S$ = signal representative of the flow rate of the bottoms product stream.

15. A process, as set forth in claim 14, wherein $K_{TB}$ is a value in the range of about 85°–150°F.

16. A process, as set forth in claim 14, wherein controlling the flow rate of the bottoms product stream comprises:

delivering a signal $L_B$ representative of the amount of a preselected component in a volume of liquid from the lower portion of the column;

receiving said signal $L_B$, comparing said signal to a preselected setpoint (SP $L_B$), and delivering a signal $B_B$ representative of the difference between the received signal and said setpoint;

receiving signals $B_B$ and F and delivering a signal $B_S$ representative of the quantity $(K_{BFR} + B_B)(F)$;

where $K_{BFR}$ = preselected liquid bottoms product stream flow rate divided by preselected feed flow rate; and controlling the flow of the liquid bottoms product stream from the column in response to signal $B_S$.

17. A process, as set forth in claim 14, including adjusting signals $B_S$, $R_B$, $R_{DFG}$, and F by applying a dead time and lag time constants thereto.

18. A process, as set forth in claim 8, wherein controlling the flow rate of the bottoms product stream comprises:

delivering a signal $L_B$ representative of the amount of a preselected component in a volume of liquid from the lower portion of the column;

receiving signal $L_B$ representative of the amount of a preselected component in a volume of liquid from the lower portion of the column;

receiving signal $L_B$, comparing said signal to a preselected setpoint (SP $L_B$), and delivering a signal $B_B$ representative of the difference between the received signal and said setpoint;

receiving signals $B_B$ and F and delivering a signal $B_S$ representative of the quantity $(K_{BFR} + B_B)(F)$;

where $K_{BFR}$ = preselected liquid bottoms product stream flow rate divided by preselected feed flow rate, said signal F being a signal representative of the flow rate of the feedstream; and controlling the flow of the liquid bottoms product stream from the column in response to signal $B_S$.

19. A process, as set forth in claim 18, wherein $K_{BFR}$ is a value in the range of about 0.02–0.1.

20. A process, as set forth in claim 18, including adjusting the flow signal F by applying dead time and lag time constants thereto.

* * * * *